Figure 1:
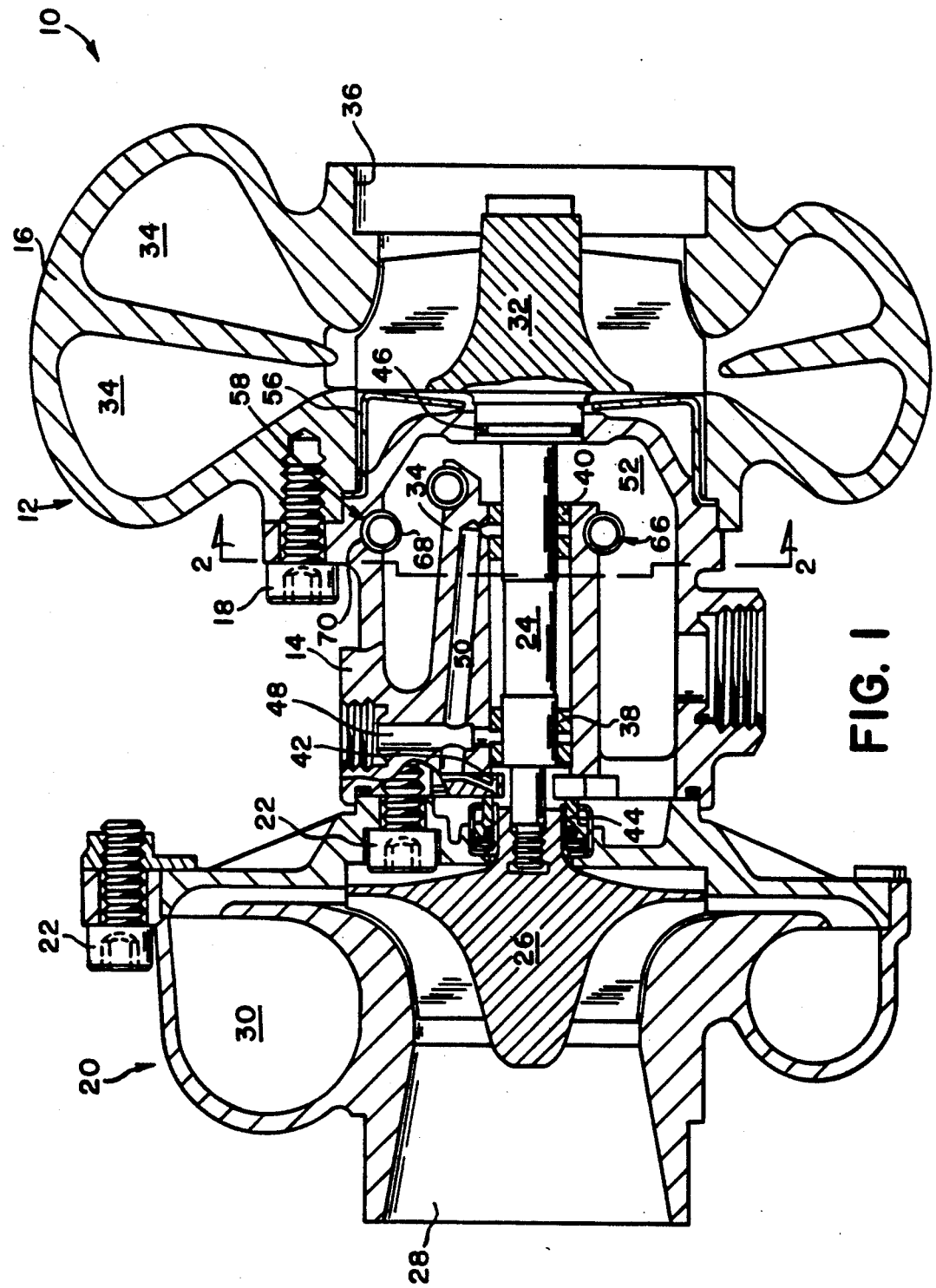

United States Patent [19]
Smith

[11] Patent Number: 5,161,960
[45] Date of Patent: Nov. 10, 1992

[54] TURBOCHARGER WITH LIQUID COOLED HOUSING

[75] Inventor: Michael M. Smith, Cypress, Calif.

[73] Assignee: Allied-Signal Inc., Morristown, N.J.

[21] Appl. No.: 790,954

[22] Filed: Nov. 12, 1991

[51] Int. Cl.⁵ .............................................. F04B 17/00
[52] U.S. Cl. .................................. 417/407; 184/6.11
[58] Field of Search ....................... 417/405, 406, 407; 184/6.11; 60/605.3

[56] References Cited

U.S. PATENT DOCUMENTS

| Re. 30,333 | 7/1980 | Gordon, Jr. et al. |
|---|---|---|
| 2,925,215 | 2/1960 | Weatherbee ............... 417/407 |
| 2,933,044 | 4/1960 | Williams ................... 417/407 |
| 3,303,994 | 2/1967 | Morooka .................... 417/407 |
| 4,157,881 | 6/1979 | Kasuya . |
| 4,716,735 | 1/1988 | Ruf et al. . |
| 4,752,193 | 6/1988 | Horler ....................... 184/6.11 |
| 4,829,939 | 5/1989 | Veenemans et al. . |
| 4,927,336 | 5/1990 | Rossmann et al. . |
| 4,928,637 | 5/1990 | Naitoh et al. . |

FOREIGN PATENT DOCUMENTS 0104721  6/1985  Japan ............................. 60/605.3

Primary Examiner—Richard A. Bertsch
Assistant Examiner—Timothy S. Thorpe
Attorney, Agent, or Firm—Ken C. Decker; William N. Antonis

[57] ABSTRACT

A turbocharger is provided with a tubular insert that carries engine coolant to an area adjacent the bearing supporting the end of the shaft upon which the turbine wheel is attached to provide cooling so that the temperature of the bearing does not increase to an unacceptable level.

9 Claims, 2 Drawing Sheets

TURBOCHARGER WITH LIQUID COOLED HOUSING

This invention relates to an exhaust gas driven turbocharger for an internal combustion engine which is cooled by the engine coolant system.

Exhaust gas driven turbochargers operate at extremely high speeds and at high temperatures. Because turbochargers must operate at high operating speeds, the bearings used in turbochargers must be lubricated by the engine lubrication system. Upon engine shutdown, however, the flow of lubricating oil through the bearings is discontinued so that the cooling effect of the lubricating oil is lost. Accordingly, turbocharger bearings often reach very high temperatures immediately after engine shutdown. To control this increase in temperature it has become common in turbochargers to incorporate a water jacket connected to the engine coolant system, particularly for small turbochargers used on internal combustion engines for automobiles.

However, water cooled turbochargers are relatively costly as compared to turbochargers that are not cooled, because the prior art water jackets are formed within the cast turbocharger housing, which requires a separate core material during casting. The core material must be cleaned from the casting in a relatively complex operation. Furthermore, the casting yield is relatively low because of core shift during manufacture and because the cast turbocharger housing is subject to leaks which cannot be detected until after the casting is completed. Furthermore, the water jacket requires additional cast walls within the housing which adds undesirable weight to the completed turbocharger assembly. Finally, the cast water jacket is in the portion of the housing adjacent the turbine end seal. Accordingly, the water jacket interferes with the oil slinger effects of the seal, causing reduced turbine seal performance.

The present invention provides a separate tubular insert which is placed in the standard mold during casting, and thus requires no clean-out or separate core pieces. Further, cast walls within the turbocharger housing are reduced, thus reducing weight, and the tubular insert can be tested before installation in the casting mold to be sure that it is free of leaks. The ends of the tubular insert project from the housing for connection to the engine coolant supply system.

Figure 2:
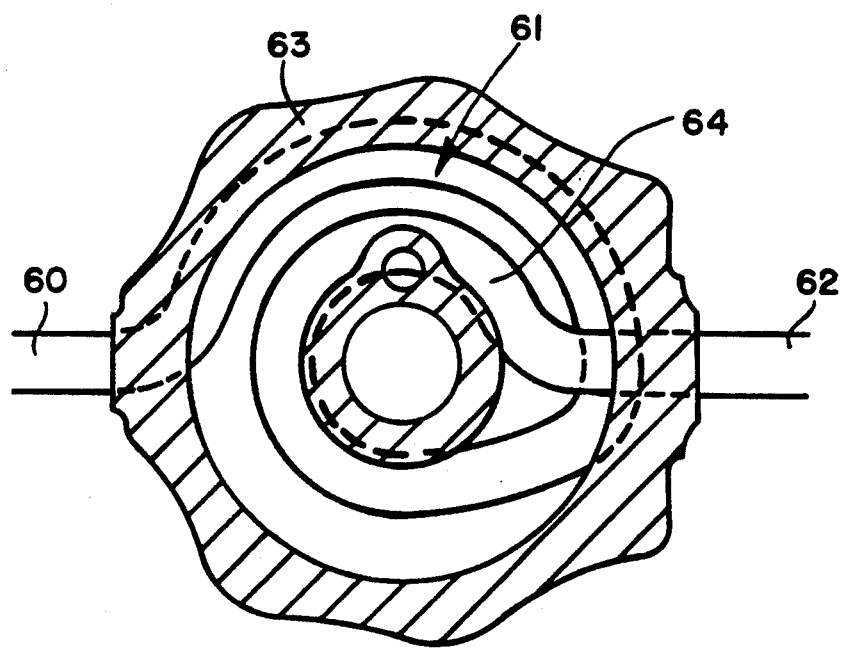

These and other advantages of the present invention will become apparent from the following description, with reference to the accompanying drawings, in which:

FIG. 1 is a longitudinal cross-sectional view of a turbocharger made pursuant to the present invention; and FIG. 2 is a transverse cross-sectional view taken substantially along lines 2—2 of FIG. 1.

Referring now to the drawings, a turbocharger generally indicated by the numeral 10 includes a housing 12 consisting of a center housing portion 14, a turbine housing portion 16 which is secured to one end of the center housing portion 14 by bolts 18, and a compressor housing portion 20 which is secured to the opposite end of the center housing portion 14 by bolts 22. A shaft 24 is rotatably supported within the center housing portion 14 as will hereinafter be described. A compressor wheel 26 is mounted on one end of the shaft 24 and extends into the compressor housing portion 20. The compressor housing portion 20 includes an ambient air inlet 28, which is connected to the engine air filter, and an outlet volute 30, which is connected to the engine induction manifold. Rotation of the compressor wheel 26 with the shaft 24 draws air into the inlet 28, compresses the air, and discharges the air into the outlet volute 30 in a manner well known to those skilled in the art. A turbine wheel indicated by the numeral 32 is mounted on the end of the shaft 24 opposite the end upon which the compressor wheel 26 is mounted. Turbine wheel 32 rotates within turbine housing portion 16, and is supplied with high energy exhaust gasses discharged from the exhaust manifold of the engine upon which the turbocharger 10 is used through inlet volute passages 34 of conventional design. After passing through the turbine wheel 32, the exhaust gasses are discharged into the vehicle's exhaust system through exhaust outlet 36. The design of the turbocharger shaft 24, compressor wheel 26, turbine wheel 32 and housing portions 14, 16, and 20 are conventional, and will not described in detail.

The shaft 24 is rotatably supported within the center housing portion 14 by journal bearings 38, 40. Journal bearing 38 supports the end of the shaft 24 upon which the compressor wheel 26 is mounted, and journal bearing 40 supports the end of the shaft 24 upon which the turbine wheel 32 is mounted. A conventional thrust bearing 42 controls axial displacement of the shaft 24. A compressor end seal 44, and turbine end seal 46 prevent oil from escaping the center housing portion 14. Lubricating oil is supplied to the bearings 38, 40 and 42 by oil passages generally indicated at 48, 50. After passing through the bearings, the oil drains into a sump 52. Sump 52 at least partially circumscribes bearing retention and support portion 54 of the center housing portion 14, which projects into the sump 52 as illustrated in the drawing. A metal heat shield 56 partially protects the center housing portion 14 from the high temperature of the exhaust gasses which pass through the turbine wheel 32. Heat shield 56 may be disconnected if the cooling effects of the liquid coolant are sufficient.

As discussed above, oil flow through the bearings 38, 40 and 42 during normal operation of the turbocharger 10 assists in cooling the bearings so that the relatively high temperatures generated within the turbine housing portion 12 by the exhaust gasses passes therethrough does not damage the bearings. However, after engine shut down, oil flow through the bearings is discontinued. Residual heat in the turbine housing portion 12, even through partially shielded from the center housing portion 14 by heat shield 56, raises the temperature within the center housing portion 14 to an unacceptable level that may cause damage to the bearings. Heat is also conducted through shaft 24 to the bearings 38 and 40, particularly the bearing 40, which is closest to the turbine wheel 32. Accordingly, it has become common to permit engine coolant to flow through a water jacket cast within the center housing 14 to prevent increase of temperature to a degree that will damage the bearings and other rotating components of the turbocharger. However, as also discussed above, turbocharger center housing portions including such water jackets cast integral with the center housing when the turbocharger is manufactured have been difficult to manufacture economically and add substantial weight to the turbocharger.

The present invention provides cooling by circulating engine coolant through a thin walled, coiled tubular insert generally indicated by the numeral 58. The tubular insert 58 is installed in the mold when the turbocharger center housing is cast. The tubular insert 58 includes end portions 60, 62 which project from the center housing portion 14 for connection to the vehicle coolant supply system. As is well known to those skilled in the art, the turbocharger bearing 40 which is adjacent to the turbine housing portion 12 is most susceptible to overheating and damage as a result thereof because of its position closest to the heat source provided by the turbine housing portion 12. Although the other bearings 38 and 42 may also be damaged by heat, damage is less likely because they are further away from the heat source provided by the turbine housing portion 12. The tubular insert 58 is provided with a coiled portion generally indicated by the numeral 61 which includes a first loop 63 which circumscribes at least a portion of the sump 52 and second loop 64 which circumscribes at least a portion of the bearing retention portion 54 immediately adjacent the bearing 40. Accordingly, the engine coolant is carried to that portion of the turbocharger center housing portion 14 that is closest to the critical bearing 40 which is most susceptible to overheating.

The tubular insert 58 includes a circumferentially extending wall 66, a portion 68 of which projects from the wall of the sump 52 and from the bearing retention portion 54 into the sump 52, and further includes a portion 70 which is embedded within the wall of the sump 52 or within the structure defining the bearing retention portion 54. The tubular insert 54, since it is installed in the mold before the molten material from which the center housing portion 14 is poured, can readily be placed in the appropriate place by techniques well known to those skilled in the art.

When the turbocharger 10 is installed on the engine upon which it is to be used and coolant system used by the engine is connected to the end 60, 62 of the tubular insert 58, engine coolant may circulate through the center housing portion 14 of the turbocharger to maintain the temperature thereof at an acceptable level so that damage to the bearings and other rotating components is prevented. Furthermore, the thin walls of the tubular insert 58 weigh substantially less than the additional cast walls that were necessary in prior art liquid cooled turbochargers, thereby desirably reducing the weight of the overall turbocharger assembly. Still further, the water jacket cast in prior art water cooled turbochargers, in order to be effective, had to be cast adjacent the area in which the bearing 40 adjacent the turbine wheel was to be installed, and preferably was cast between the turbine housing portion 16 and the bearing 40. Water jackets cast in that area interfered with the oil slinger effects of the turbine end seals 46 and 56, thereby reducing their effectiveness. With the tubular inserts of the present invention, the oil slinging effects of the turbine end seals is not impeded.

I claim:

1. Turbocharger comprising a housing, a shaft within said housing, means for supporting said shaft for rotation relative to said housing, a turbine wheel mounted on one end of said shaft for rotation therewith, a compressor wheel mounted on the other end of the shaft for rotation therewith, means for directing relatively hot exhaust gasses through said turbine wheel, means for directing air through said compressor wheel for compression by the compression wheel, and a tubular insert carried by said housing, said tubular insert extending through said housing and having a pair of ends projecting from said housing for connection with a coolant supply system so that coolant supplied by said supply system is communicated through said housing within said tubular insert to thereby prevent overheating of said housing by the exhaust gasses, said tubular insert including a coiled portion, said coiled portion at least partially circumscribing said shaft.

2. Turbocharger as claimed in claim 1, wherein said shaft is supported by a pair of bearings carried by said housing, one of said bearings supporting the end of the shaft upon which the turbine wheel is mounted and the other bearing supporting the end of the shaft upon which the compressor wheel is mounted, said tubular insert extending through said housing at a point adjacent said one bearing.

3. Turbocharger comprising a housing, a shaft within said housing, means for supporting said shaft for rotation relative to said housing, a turbine wheel mounted on one end of said shaft for rotation therewith, a compressor wheel mounted on the other end of the shaft for rotation therewith, means for directing relatively hot exhaust gasses through said turbine wheel, means for directing air through said compressor wheel for compression by the compressor wheel, and a tubular insert carried by said housing, said tubular insert extending through said housing and having a pair of ends projecting from said housing for connection with a coolant supply so that coolant supplied by said supply system is communicated through said housing within said tubular insert to thereby prevent overheating of said housing by the exhaust gasses, said tubular insert including a coiled portion, a portion of said coiled portion being embedded within said housing.

4. Turbocharger as claimed in claim 3, wherein said shaft is supported by a pair of bearings carried by said housing, one of said bearings supporting the end of the shaft upon which the turbine wheel is mounted and the other bearing supporting the end of the shaft upon which the compressor wheel is mounted, said tubular insert extending through said housing at a point adjacent said one bearing.

5. Turbocharger as claimed in claim 3, wherein said housing included means for communicating lubricating oil to said bearings and a sump cavity for receiving lubricating oil after passing through said bearings, said tubular insert passing through said sump cavity adjacent said one bearing.

6. Turbocharger as claimed in claim 5, wherein said coiled portion circumscribes said sump cavity.

7. Turbocharger as claimed in claim 6, wherein said tubular insert is defined by a circumferentially extending wall, said sump being defined by a sump wall, said circumferentially extending wall of said tubular insert including a portion embedded in said sump wall and a portion projecting from the sump wall.

8. Turbocharger as claimed in claim 6, wherein said housing includes a bearing retention portion projecting into said sump, said coiled portion of said tubular insert including a first loop extending at least part of the way around said sump and a second loop extending at least part of the way around said bearing retention portion.

9. Turbocharger as claimed in claim 8, wherein a portion of said coiled portion is embedded within said housing.

* * * * *